Figure 1:
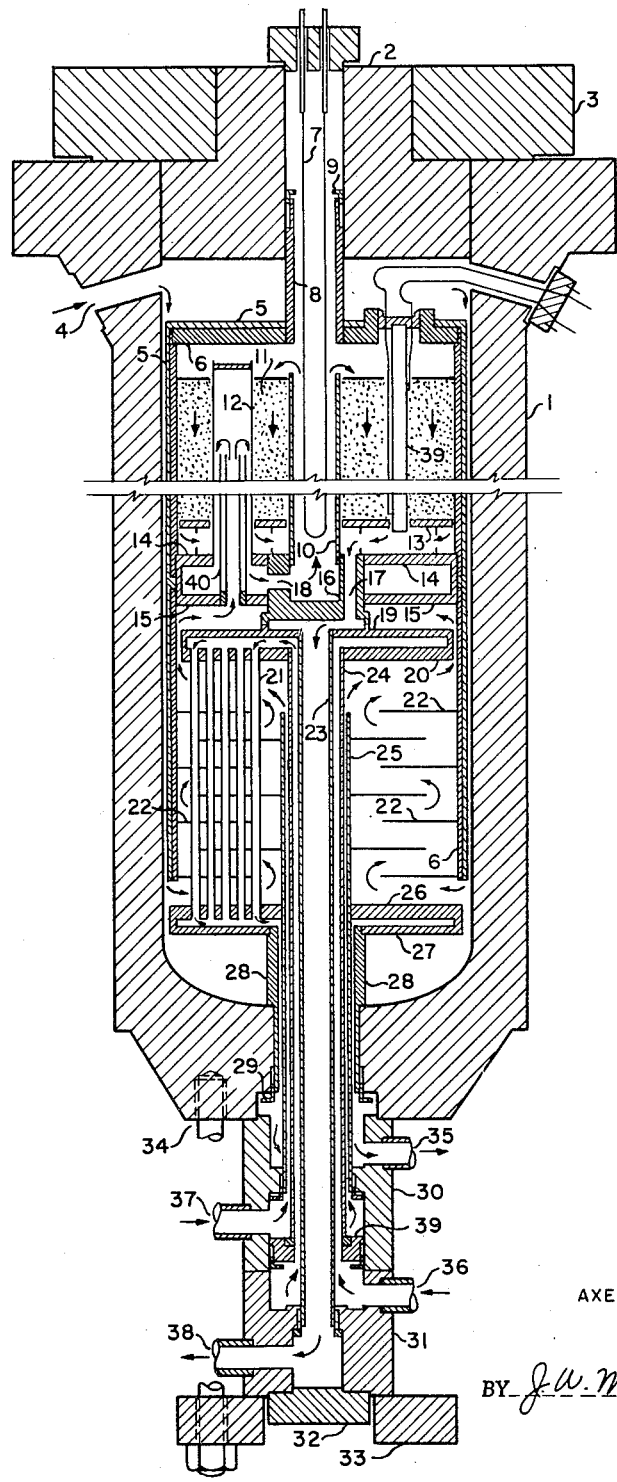

June 26, 1962 A. CHRISTENSEN 3,041,151
APPARATUS FOR EXOTHERMIC CATALYTIC REACTIONS
Filed March 9, 1959 7 Sheets-Sheet 2

AXEL CHRISTENSEN
INVENTOR.

BY J. W. McCloskey
AGENT

June 26, 1962  A. CHRISTENSEN  3,041,151
APPARATUS FOR EXOTHERMIC CATALYTIC REACTIONS
Filed March 9, 1959  7 Sheets-Sheet 3

AXEL CHRISTENSEN
INVENTOR.

BY J. W. McCloskey
AGENT

June 26, 1962 A. CHRISTENSEN 3,041,151
APPARATUS FOR EXOTHERMIC CATALYTIC REACTIONS
Filed March 9, 1959 7 Sheets-Sheet 4

AXEL CHRISTENSEN
INVENTOR.

BY J.W. McCloskey
AGENT

June 26, 1962  A. CHRISTENSEN  3,041,151
APPARATUS FOR EXOTHERMIC CATALYTIC REACTIONS
Filed March 9, 1959  7 Sheets-Sheet 6

AXEL CHRISTENSEN
INVENTOR.

BY J. W. McCloskey
AGENT

United States Patent Office 3,041,151
Patented June 26, 1962

3,041,151
APPARATUS FOR EXOTHERMIC CATALYTIC REACTIONS
Axel Christensen, Stamford, Conn., assignor to Chemical Construction Corporation, New York, N.Y., a corporation of Delaware
Filed Mar. 9, 1959, Ser. No. 797,950
3 Claims. (Cl. 23—289)

This invention relates to an apparatus for effecting an exothermic vapor phase catalytic reaction wherein a gaseous reaction mixture is passed through a stationary catalyst bed. The invention is particularly applicable to the useful recovery of steam during exothermic vapor phase catalytic reactions which are conducted at high pressure. This invention is further concerned with the recovery of steam during such reactions as ammonia synthesis, synthesis of methanol from hydrogen and carbon monoxide, the Fischer-Tropsch synthesis of hydrocarbons and high alkanols and other similar hydrogenation reactions.

The apparatus used in this invention is somewhat similar to the converters described in U.S. Patents Serial Nos. 1,707,417 and 2,853,371. In addition the steam recovery modification uses a flow sequence somewhat similar to that described in U.S. application Serial No. 752,225, filed July 31, 1958. The patents referred to relate to cooling of the reacting gas in the catalyst by means of colder unreacted gas passing through cooling tubes in catalyst before said gas enters the catalyst. The reacting gas in the catalyst and the cooling gas in the tubes flow in the same direction or are cocurrent. This type of apparatus has been found to be highly successful in production of chemical compounds such as those enumerated above. The application referred to relates to provision of means to generate relatively high pressure steam in conjunction with this type of apparatus. The point of novelty of the present application as contrasted to the prior art involves the flow of hot gases within the converter. An apparatus concept and arrangement is provided which produces a centralized flow with consequent improved catalyst bed cooling and improved means for transfer of hot gases.

In the prior art the flow of gas in the main stream enters the converter and flows through the annulus between the high pressure closure and internals and through an interchanger. Close to the exit of the interchanger, any by-passed gas is mixed with the main gas stream and the total gas stream of unconverted gas flows through the cooling tubes in the catalyst. The gas, now preheated to reaction temperature, is collected and flows to the catalyst as a single stream. The gas stream is usually contained in a central passage conduit which conducts the gas upwards through, but separated from, the catalyst bed. Then the gas stream is dispersed over the catalyst bed, flowing downwards through the catalyst. An electric heater is usually placed in the central passage conduit to preheat the gas stream prior to its passage to the catalyst bed during start-up operations.

The gas passing over the catalyst reacts to form, for example—ammonia, and the heat generated is transferred to the unconverted gas in the cooling tubes except for the part that is absorbed as sensible heat in the converted gas which leaves the catalyst at substantially 500° C. The converted gas flows next through the interchanger where it transmits sensible heat to the unconverted gas as required. With this flow pattern, all of the heat of reaction is retained in the gas finally leaving the converter as sensible heat. Although considerable heat is contained in the final exit converted gas as sensible heat, the temperature level at which it is available is too low for effective heat recovery. Nevertheless, in some instances it has been found profitable to generate low pressure or even high pressure steam from this sensible heat.

Two prior methods of obtaining steam from heat generated in the converter are—(1) as suggested in the above paragraph by recovering what heat is available from the stream of gas exiting from the converter, and (2), a series of coils within the catalyst bed through which water passes to be heated up and thereafter to supply heat to an external boiler. Both of these methods contain defects and drawbacks. The reason for the poor showing in recovery of heat as steam from the exiting gas is that the temperature is too low for effective heat recovery as has been pointed out in the above paragraph. As for the second method of recovering steam, the main difficulty is the fact that the water circulating in the coils must be of the highest degree of purity to prevent tube failure by corrosion in the presence of such excessive temperatures and pressures as incurred in converters such as ammonia converters. An additional disadvantage is the fact that if there is failure of the external boiler within and appurtenances thereto, the whole system, both converter and steam generating plant, must be shut down for repairs. One of the principal advantages of the present invention is that it provides a simplified and more efficient heat recovery as steam. The heat recovery is at the high temperature level of the gases immediately exiting the catalyst bed.

In the present-day commercial installations, converters are generally expected to operate efficiently for a period of years befor shutdown for maintenance or catalyst bed replacement is necessary. One of the major factors in shortening catalyst life in practice is localized overheating or hot spots in the catalyst bed. Thus a major aspect of converter design concerns the spacing and layout of the cooling tubes in the catalyst bed. Heretofore, there have been certain restrictions on the layout of the cooling tubes due to practical considerations of gas flow to and from the catalyst bed. In the prior art the gas flow has been downwards through the catalyst bed and supporting grid, and then directed outwards toward the converter wall by a horizontal baffle. Then the hot converted gas stream, after flowing out toward the converter wall and down around a vertical baffle, is directed to the internal heat exchanger. In the modification described in U.S. application Serial No. 752,225, filed July 31, 1958, instead of directing the hot converted gas to the internal heat exchanger, this gas is conducted directly out of the converter for external heat exchange by means of a group of flexible tubes.

However, these arrangements result in a restriction on the spacing of the cooling tubes, since the provision of space toward the converter wall for the downward flow of the hot converted gas limits the location of cooling tubes relative to the converter wall. Thus the outermost cooling tubes must be spaced a certain minimum distance from the converter wall, in order to provide clearance for the aforementioned downward flow. Consequently, the outermost portions of the catalyst bed may not receive sufficient cooling, and the danger of localized overheating of the bed around its outer periphery is always present.

In this invention an apparatus arrangement has been conceived, whereby the aforementioned disadvantages are overcome. The hot converted gas, after leaving the catalyst bed, is first directed horizontally inwards toward the center of the converter. Then the gas stream passes downward through a series of passages which are adjacent to, but independent of, the passages which serve to conduct the hot unconverted gas upwards to the top of the catalyst bed. The hot converted gas is then collected in a central chamber and passed directly out of the converter for heat recovery through a central passage which may be concentric with other gas flow passages. Thus a centralized flow pattern has been achieved.

This arrangement possesses several remarkable advantages. First, a new flexibility in cooling tubes location within the catalyst bed. Since the cooling tubes may now be placed at or adjacent to the periphery of the catalyst bed, rather than being kept a minimum distance from the converter wall to provide clearance for the peripheral downward flow of converted gas in the prior art, the possibility of the generation of hot spots or localized overheating in this region of the catalyst bed has been considerably reduced. In addition, since the hot converted gas is now collected as a single central flow, a simpler mechanical arrangement is possible when the hot gas is to be employed as a source of high pressure steam. Thus the present invention in some ways represents an improvement over the concepts developed in U.S. application Serial No. 752,225, filed July 31, 1958, in which the hot converted gas is removed from the converter for steam generation by means of a group of peripheral flexible tubes. Since in a preferred embodiment of the present invention the adjacent centralized passages for flow of unconverted and converted gas are produced as bored holes in a single central block of metal, fabrication and operating problems such as expansion considerations are reduced or eliminated.

It should be noted that the present invention contemplates and retains all the advantages and improvements, as far as heat recovery is concerned, as described in the aforementioned U.S. application Serial No. 752,225, filed July 31, 1958. Thus the basic improvement of removing the hot converted gas from the converter for heat recovery immediately after this gas leaves the catalyst bed, whereby heat is recovered at a higher and more usable temperature level, is an important aspect and usage of this invention.

It is an object of this invention to provide more efficient and better cooling within the catalyst bed of catalytic exothermic converters.

Another object is to secure a centralized gas flow within such converters, whereby a simplified and more readily fabricated converter design is possible.

A further object is to provide a gas flow system which compensates and allows for thermal expansion in a simplified manner, when hot converted gas is conducted out of such converters for external heat recovery.

Other objects of this invention will become apparent from the description of the apparatus shown in FIGURES 1 through 6.

FIGURE 1 illustrates an embodiment of the invention wherein high level heat recovery as steam may be accomplished in an external unit such as a steam boiler. Referring to the figure, the high pressure converter consists basically of a chamber defined by high pressure shell 1 and cap plates 2 and 3. The unconverted feed gas enters via 4 and passes down through the annular space between shell 1 and circulating plate 5. This arrangement provides maximum cooling for the shell 1. The gas stream leaves the annular space toward the bottom of the converter chamber, and passes upward on the shell side of the heat exchanger defined by plate 6, tubes 21 and baffles 22. The gas stream is warmed by indirect heat exchange with the gas inside tubes 21 and toward the upper or warm end of the exchanger an additional quantity of cold feed gas may be intermixed with the warmed gas for temperature control. This additional quantity of cold gas is admitted via line 37 and the annular space between conduits 25 and 24, which are concentric pipes or tubes.

The warmed and temperature-adjusted feed gas stream is now directed outwards by baffle 20 and upwards through the peripheral clearance into the distributing chamber defined by plates or baffles 19 and 15. Referring to the left side of the figure, which illustrates the preferred cooling tube arrangement, the gas stream leaves the distributing chamber and enters a series of inner tubes such as 40 which may be of an insulating nature. The gas stream is conducted by tube 40 into heat exchange with the catalyst bed 11, and flows downwardly in cocurrent heat exchange in the annular space between pipe 40 and concentric outer pipe 12. Thus the feed gas stream is warmed further, and serves to moderate the temperature rise from the conversion reaction in the catalyst bed.

The feed gas stream, now warmed to the proper temperature for catalytic conversion, passes downwardly into the chamber defined by plates 14 and 15, and inwardly via passages 18 into a central chamber in block 16. Block 16 is a single unit containing a group of radial horizontal passages 18 which meet at a central upward outlet which joins conduit 10. Block 16 also contains a group of independent vertical passages 17 for downward flow of converted gas. Passages 17 are adjacent to but not connected with passages 18, with each passage 17 located in the space or geometric sector between two adjacent passages 18, all within unit 16.

The warmed feed gas stream passes upwardly through the central chamber in block 16 as a combined gas stream from passages 18, and enters conduit 10. Conduit 10 contains an electric heater 7, admitted through block 2 via a passageway formed by conduit 8 which is sealed against plate 2 by upper gas seal 9. Electric heater 7 is used during start-up to heat the gas stream to conversion temperatures. Under ordinary operating conditions, heater 7 is not required since the necessary heat is obtained from the conversion heat of reaction in the cooling tubes and heat exchanger.

The feed gas stream leaves the top of conduit 10 at the proper conversion temperature and is dispersed by baffle 6 over catalyst bed 11. The gas stream flows downwardly through bed 11 and exothermic conversion takes place. The temperature in bed 11 is measured by thermocouples 39, with variation from desired set points being readily compensated for by varying the ratio of input gas stream flow admitted via 4 to the cooling flow admitted via 37 and also by varying the total amount of input gas feed. The hot converted gas stream leaves the bottom of catalyst bed 11 through grid support 13 and is directed through the space defined by catalyst bed grid support 13 and baffle 14 into downward passages 17. The gas stream leaves the bottom of passages 17 and becomes a single combined flow, leaving the converter via central passage 23 and exit conduit 38.

The hot converted gas stream now passes through an external heat recovery device such as a steam boiler, not shown, and is partially cooled. The partially cooled gas stream re-enters the converter via conduit 36 and passes upward through the annular space between passages 23 and 24. Sufficient sensible heat is left in the partially cooled converted gas stream, for it to be a suitable heat source to warm the cold incoming feed gas. The partially cooled converted gas stream then enters the distributing chamber defined by baffles 20 and 19, and passes downward through heat exchanger tubes 21. The converted and now relatively cold gas stream is collected in the chamber defined by baffles 26 and 27, and passes downward in the annular space between conduit 25 and circular support 28, and finally leaves the converter via 35.

It should be noted that, in this preferred embodiment of the invention, the centralized flow pattern allows transfer and removal of the hot converted gas through 23 which is the centermost of a group of concentric conduits which in effect provide insulation for the hot gas in 23. Thus the hot gas leaves via 38 at the highest possible temperature level that may be practically achieved.

Figure 2:
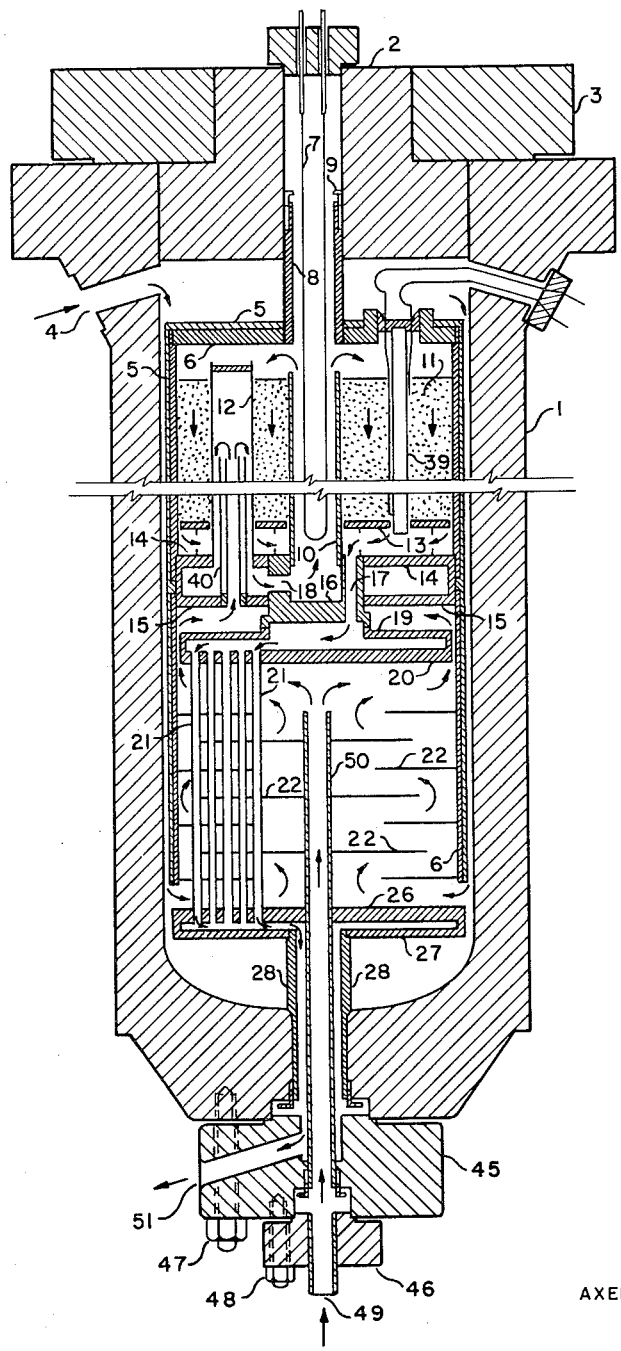

A modified form of the invention which is devoted exclusively to the centralized flow concept is shown in FIGURE 2. The basic flow pattern and nomenclature of FIGURE 2 is essentially the same as FIGURE 1, up to the point where the hot converted gas leaves the catalyst bed and is directed centrally downwards. The pre-conversion flow in FIGURE 2 will therefore be described in brief terms only. Referring to FIGURE 2, the converter is defined by high-pressure shell 1 and top plates 2 and 3. The gas stream enters via 4, is directed downward in the annular space between baffle 5 and shell 1, and then flows upward within the shell 6 of heat exchanger having tubes 21 and baffles 22. The gas stream temperature is controlled by supplementary cold gas admitted via conduit 49 leading through cap 46 fastened by bolt 48 into conduit 50 and upwards to intermix with heated feed gas at the hot upper end of the heat exchanger. The warm feed gas now proceeds upwards via chamber defined by baffles 15 and 19 into insulated tubes 40 leading into cooling tubes space which is annular space between tubes 40 and 12. Hot feed gas flows downward into chamber defined by baffles 14 and 15 and into horizontal passages 18 in central block 16. Then combined gas stream passes upward in conduit 10 having start-up electric heater 7 which is admitted via conduit 8 having upper gas seal 9. Hot feed gas is then dispersed by baffle 6 over catalyst bed 11, temperature control in bed 11 is achieved by thermocouples 39 which control gas input flow rate and temperature.

The hot converted gas stream leaves the bottom of catalyst bed 11 through grid support 13 and is centrally directed via baffle 14 to vertical passages 17 which are in unit 16, adjacent to but independent of passages 18. In FIGURE 2 a generalized central flow concept is illustrated without external heat recovery. Instead, the hot converted gases flow downwards through passages 17 and then outwards through the chamber defined by baffles 19 and 20 and into heat exchange tubes 21. As the hot converted gas flows down through tubes 21, heat is given up to incoming cool feed gas circulated outside the tubes by baffles 22. Then the still warm converted gas is collected in the chamber defined by baffles 26 and 27 and passed out of the converter via the annular space between circular support baffle 28 and central conduit 50, and exit passage 51 in cap 45. The converted gas stream may be passed to heat recovery as well as product recovery operations.

It should be noted that, although the arrangement of FIGURE 1 provides more external heat recovery and this heat is obtained at a higher temperature level and thus is more useful, the arrangement of FIGURE 2 requires less heat transfer surface for feed gas preheat and hence a smaller heat exchanger may possibly be used, since the converted gas is used in the heat exchanger tubes at a higher temperature level in the case of FIGURE 2.

Figure 3:
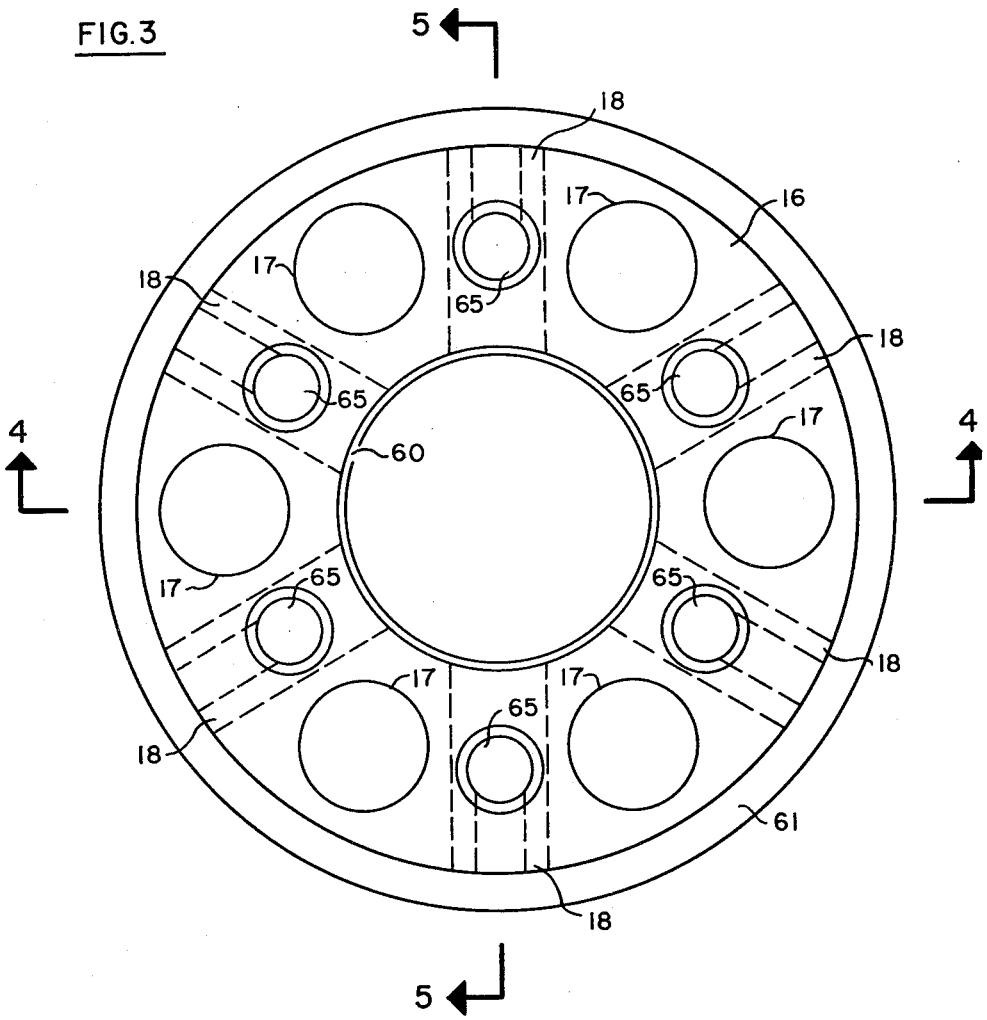
Figure 4:
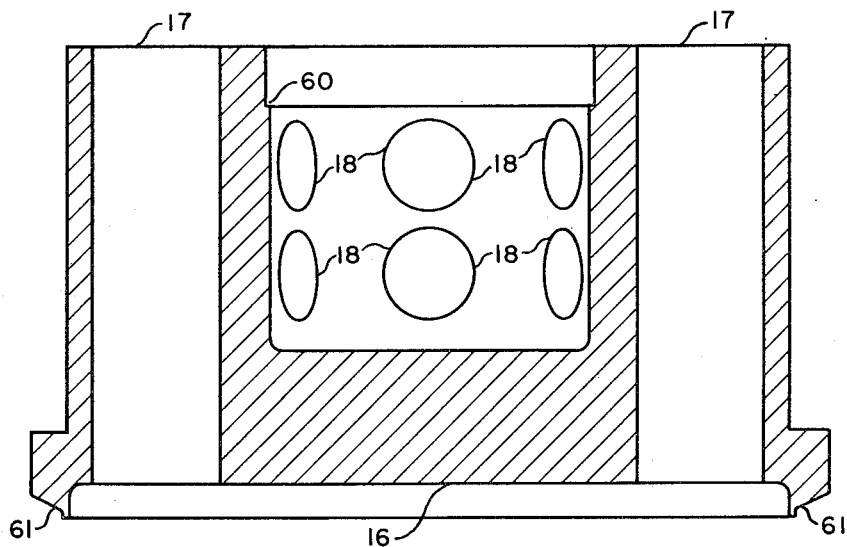
Figure 5:
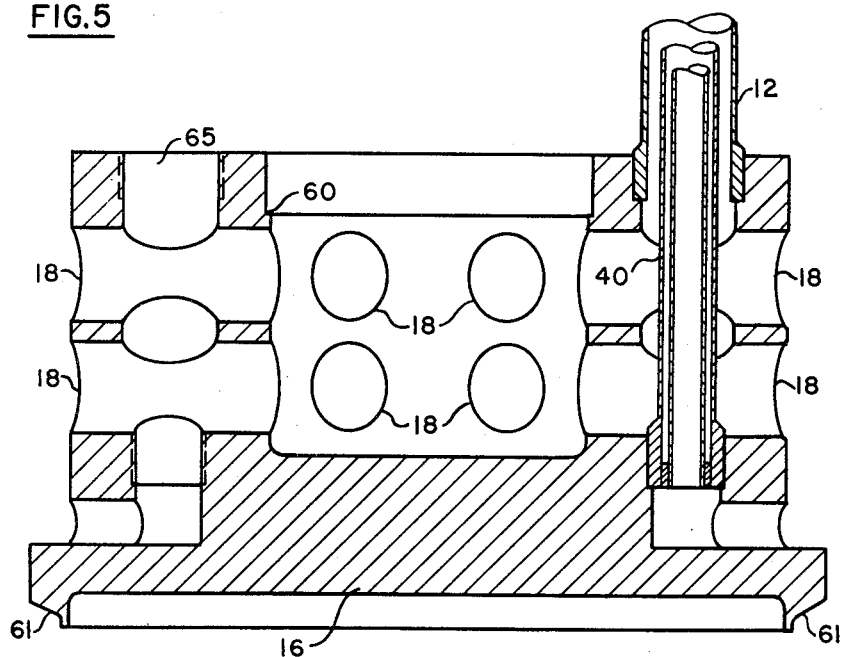

FIGURES 3, 4 and 5 show details of the central distributing block 16. Referring to FIGURE 3, a plan view of unit 16 is shown with overall features and flow passages. The outer radial dotted lines designate horizontal feed gas flow passages 18, leading in to the central collecting space which leads upwards to the conduit 10 shown in FIGURE 1 which leads to the catalyst bed. Conduit 10 fits into block 16 as far a notch 60. Downward passages for converted gas 17 are shown as large solid circles. This overall arrangement of passages 18 and 17 is further clarified in FIGURE 4 which is a sectional elevation view 4—4 of FIGURE 3. The exact orientation and function of element 65 is discussed infra, in connection with the description relating to FIGURE 5.

FIGURE 5 provides another elevation view of FIGURE 3, but on a different section 5—5. Here a practical modification of the invention to provide more complete catalyst bed cooling is illustrated. Referring back to FIGURE 3, smaller dotted lines leading to solid circles 65 are shown within outer radial dotted lines designating passages 18. As will be apparent from FIGURE 5, the inner dotted lines represent an additional separate passage below and independent of passages 18, leading to insulated cooling tube 40. The purpose of this modification is to show how catalyst cooling tubes may be located in the catalyst bed in the area immediately above unit 16. Thus in accordance with FIGURE 5, partially warmed feed gas from the lower heat exchanger is conducted in through the small bottom passage below passages 18, and upwards inside the insulated cooling tube 40. The gas stream flows out of the top of tube 40 and then downward in the annular space between 40 and outer tube 12. This downward flow provides catalyst bed cooling in the adjacent region of the bed, which is above unit 16. The feed gas, now warmed to conversion temperature, discharges down into the main warm feed gas stream in passages 18.

Figure 6:
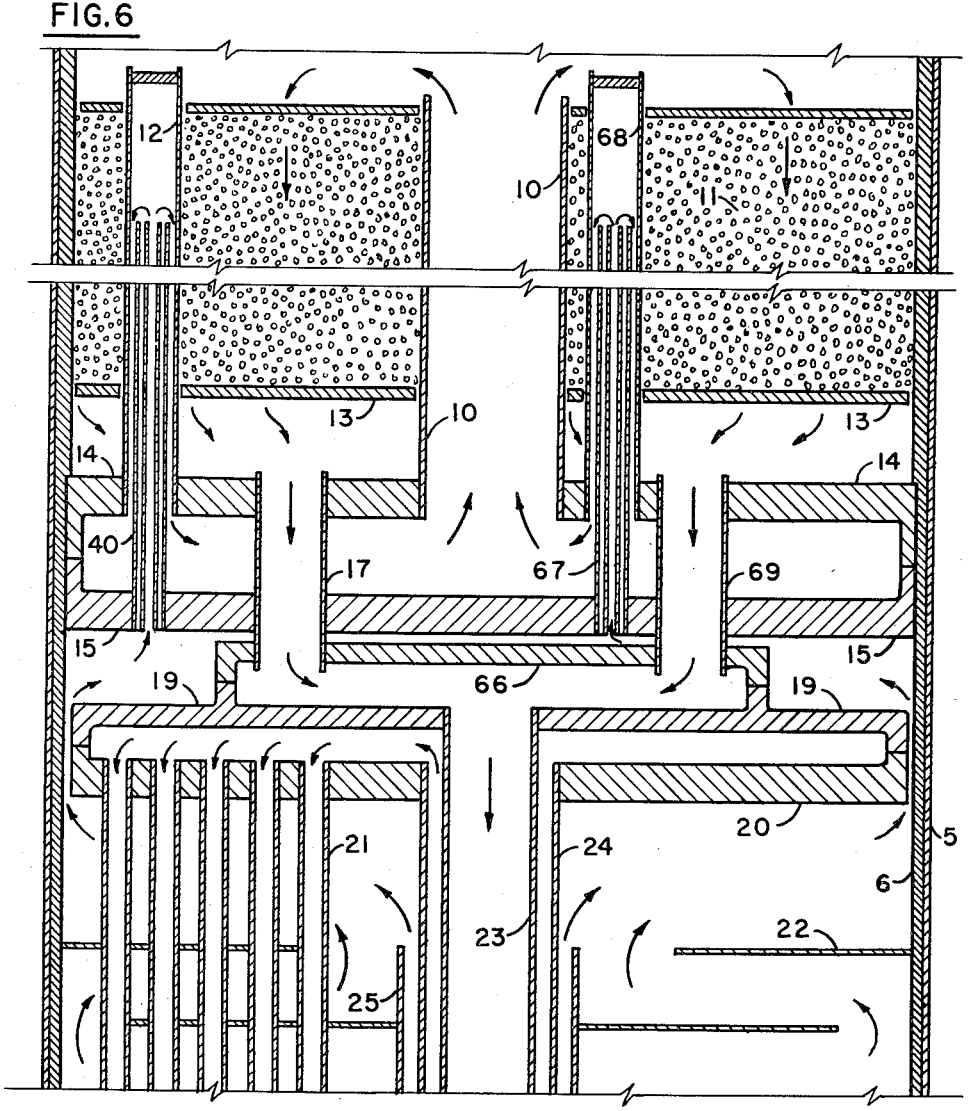

An alternative arrangement which substitutes a group of downcomer pipes for the central block unit is shown in FIGURE 6. Referring to FIGURE 6, which is an enlarged sectional view of the central part of the converter, a portion of the incoming feed gas is warmed in exchanger defined by shell 6, tubes 21 and baffles 22. The warmed feed gas may be moderated in temperature by an additional portion of cold incoming feed gas admitted in the annular space between concentric conduits 24 and 25. The total feed gas stream passes upwards through the outer annular space between shell 6 and the chamber defined by baffles 20 and 19, and enters the outer chamber defined by baffles 19 and 15. The feed gas then passes upward through the inner tube 40, and downwards in heat exchange with the catalyst bed 11 in the annular space between tube 40 and 12.

The warmed unreacted gas collects in the chamber defined by baffles 14 and 15 proceeds horizontally inward towards the center of the converter by means of the spaces between downcomer pipes 17. Then the feed gas stream passes centrally upwards in conduit 10 and downward through catalyst bed 11 wherein exothermic catalytic conversion takes place. The converted gas stream passes through catalyst bed grid support 13 and into the chamber between grid support 13 and baffle 14. The converted gas stream now passes through central downcomer pipes 17 and into the central chamber between baffles 66 and 19. Then the hot gas stream passes out of the converter for heat recovery via conduit 23 as previously described, returning in the annular space between concentric conduits 23 and 24 and passing into heat exchanger tubes 21 to warm incoming feed gas by indirect heat exchange.

FIGURE 6 also shows the cooling tube arrangement whereby cooling of the catalyst bed may be achieved adjacent to central conduit 10. The arrangement which achieves this is shown on the right side of FIGURE 6, wherein the downcomer pipe 69 is shown as another position of pipes 17. The incoming feed gas leaves the heat exchanger section and enters the outer chamber between baffles 15 and 19. A portion of this gas will proceed up through inner cooling tubes such as 67 by means of the central clearance space between baffles 66 and 15. Then the gas passes downward in the annular space between tubes 67 and 68, providing cooling in the catalyst bed area immediately adjacent to conduit 10. The gas then joins the balance of the incoming gas stream in the chamber defined by baffles 14 and 15 and proceeds upwards through conduit 10 as previously described.

Figure 7:
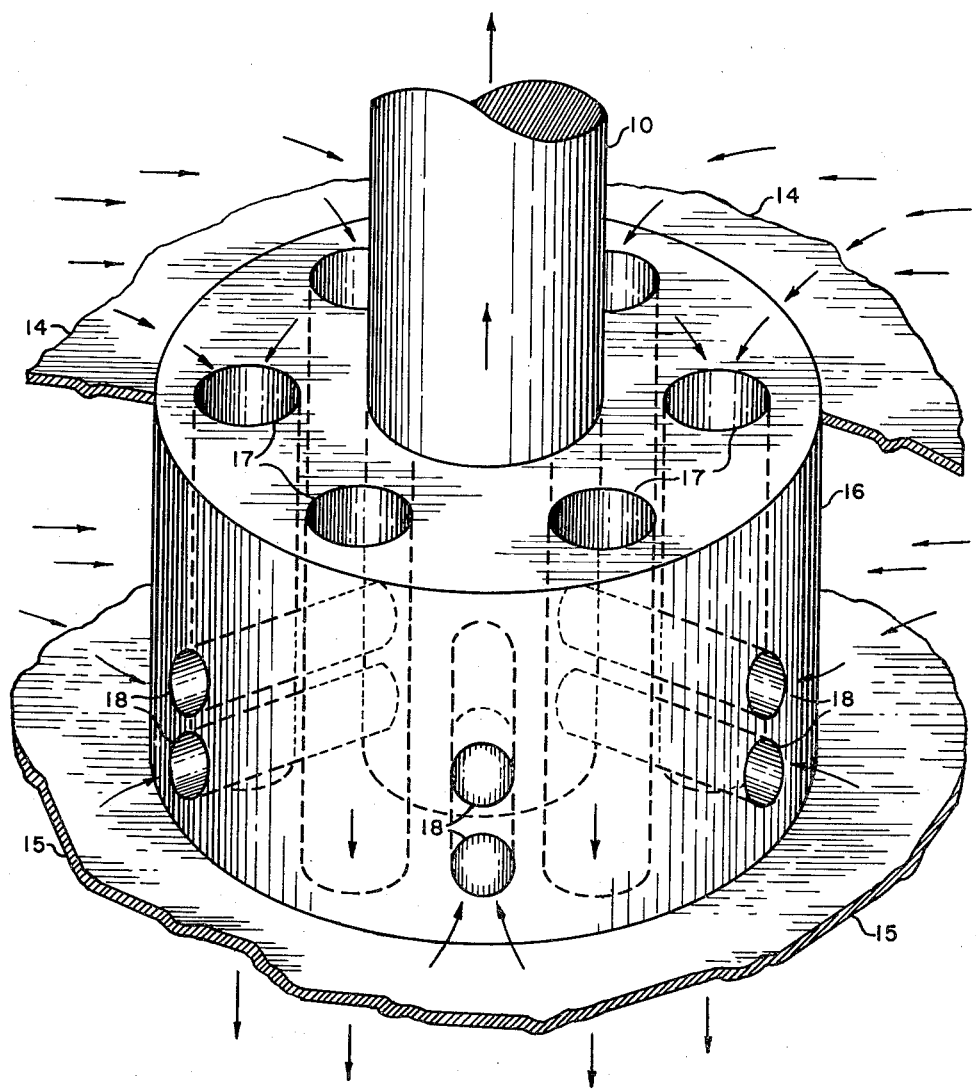

FIGURE 7 supplements FIGURES 1 through 4, and provides a simplified isometric view of the central block unit 16, together with associated baffles 14 and 15 and upwardly extending conduit 10. Thus, the unreacted gas stream is shown passing inwardly in the space between baffles 14 and 15 and thereafter into horizontal passages 18 in block 16. The unreacted gas next passes through passages 18 into a central space in block 16, and upwards through central conduit 10 for eventual catalytic reaction.

The resulting reacted gas stream is also shown, passing inwardly from above baffle 14. The reacted gas stream is thus directed into vertical passages 17 in block 16, and passes downwardly for centralized disposal below baffle 15.

Other modifications and variations will be apparent to those skilled in the art. One such variation would be to eliminate downcomer pipes 17 completely, and provide a continuous vertical cylindrical baffle instead, where pipes 17 are now located. Radial horizontal pipes could be provided, leading inwardly from the cylindrical baffle and converging on and passing gas into central conduit 10. These pipes would serve to conduct uncoverted gas to conduit 10 from the chamber defined by baffles 14 and 15, with the function of downcomer pipes 17 being handled by passing the converted gas downward in the sector-shaped spaces between the radial horizontal pipes.

I claim:

1. In an apparatus for effecting high pressure gaseous exothermic catalytic reactions comprising a reactor shell, a vertical gas circulation plate adjacent said shell, means for introduicng unreacted gas into said shell, a lower heat exchanger section, means for passing said unreacted gas mixture and catalytically reacted gas in heat exchange relation through said heat exchanger section, an upper catalyst bed section, a gas distributing section between said exchanger and bed sections, a plurality of substantially vertical inner conduits disposed within said bed for cooling, said conduits extending upwards into said bed, a plurality of outer conduits concentric with said vertical conduits, said outer conduits being closed at their upper ends whereby unreacted gas passes upwards through said inner conduits and then downwards in the annular space between said conduits to cool said bed, and exit means to conduct reacted gas out of said reactor from said exchanger section, the improved gas distributing section which comprises a central block for gas transfer to and from said catalyst bed section, upper and lower horizontal gas baffles, said baffles having inner perimeters contiguous with said block and outer perimeters contiguous with said circulation plate, whereby said baffles define a gas collection space, said block having a plurality of horizontal passages extending radially inward to a central chamber, a gas conduit extending upward from said central chamber in said block to the top of said catalyst bed section, said block also being provided with a plurality of separate vertical passages for downwards flow of reacted gas, said vertical passages extending through said block from above said upper plate to below said lower plate, with the lower ends of said outer conduits terminating at openings in said upper baffle, and the lower ends of said inner conduits terminating at openings in said lower baffle.

2. Apparatus of claim 1, in which a first vertical conduit is provided centrally below said block for removal of hot reacted gas from said vertical passages, said first conduit extending downwards from said block to hot gas egress means at the base of said reactor shell, together with means to conduct hot reacted gas from said said egress means to external heat exchange means, an external heat exchange means for heat recovery from the hot reacted gas, means to return partially cooled reacted gas into said apparatus for further heat exchange in said heat exchanger section comprising gas inlet means at the base of said reactor shell extending to an annular gas passage defined by said first vertical conduit and a second conduit, concentrically disposed about and coaxial with said first conduit, and a third concentric conduit external to said second conduit and defining a second annular passage for entry of by-pass unreacted gas into the main stream of unreacted gas after said heat exchange section.

3. Apparatus of claim 2, in which said external heat exchange means comprises a boiler for stream generation.

References Cited in the file of this patent
UNITED STATES PATENTS

| | | |
|---|---|---|
| 1,408,987 | Casale | Mar. 7, 1922 |
| 1,707,447 | Richardson | Apr. 2, 1929 |
| 1,848,466 | Edmonds | Mar. 8, 1932 |
| 1,932,247 | Kniskern | Oct. 24, 1933 |
| 2,861,873 | Worn | Nov. 25, 1958 |
| 2,910,350 | Jean | Oct. 27, 1959 |

FOREIGN PATENTS

| | | |
|---|---|---|
| 638,848 | France | June 4, 1928 |

UNITED STATES PATENT OFFICE
CERTIFICATE OF CORRECTION

Patent No. 3,041,151                                June 26, 1962

Axel Christensen

It is hereby certified that error appears in the above numbered patent requiring correction and that the said Letters Patent should read as corrected below.

Column 2, line 30, for "befor" read -- before --; column 6, line 27, after "15" insert -- and --; column 8, line 26, for "stream" read -- steam --.

Signed and sealed this 16th day of October 1962.

(SEAL)
Attest:

ERNEST W. SWIDER
Attesting Officer

DAVID L. LADD
Commissioner of Patents